(12) United States Patent
Goossen et al.

(10) Patent No.: US 8,087,315 B2
(45) Date of Patent: Jan. 3, 2012

(54) METHODS AND SYSTEMS FOR ATTACHING AND DETACHING A PAYLOAD DEVICE TO AND FROM, RESPECTIVELY, A GIMBAL SYSTEM WITHOUT REQUIRING USE OF A MECHANICAL TOOL

(75) Inventors: Emray R. Goossen, Albuquerque, NM (US); Ken E. Young, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1121 days.

(21) Appl. No.: 11/868,641

(22) Filed: Oct. 8, 2007

(65) Prior Publication Data

US 2008/0210025 A1    Sep. 4, 2008

Related U.S. Application Data

(60) Provisional application No. 60/850,597, filed on Oct. 10, 2006.

(51) Int. Cl.
*G01C 19/02*    (2006.01)
(52) U.S. Cl. .......................................................... 74/5.22
(58) Field of Classification Search ................... 74/5.22
See application file for complete search history.

(56) References Cited

U.S. PATENT DOCUMENTS

| | | |
|---|---|---|
| 4,525,052 A | 6/1985 | Kosugi et al. |
| 4,859,149 A | 8/1989 | McClain ........................ 416/215 |
| 5,005,813 A | 4/1991 | Lawrence ..................... 269/236 |
| 5,150,857 A | 9/1992 | Moffitt et al. |
| 5,152,478 A | 10/1992 | Cycon et al. |
| 5,230,490 A | 7/1993 | Sloop ............................ 248/187 |
| 5,295,643 A | 3/1994 | Ebbert et al. |
| 5,575,438 A | 11/1996 | McGonigle et al. |
| 5,695,153 A | 12/1997 | Britton et al. |
| 5,870,641 A | 2/1999 | Chrosziel ...................... 396/425 |
| 6,003,415 A | 12/1999 | Turner et al. .................... 82/159 |
| 6,059,612 A | 5/2000 | Aoyama et al. ............... 439/701 |
| 6,129,593 A | 10/2000 | Aoyama et al. ............... 439/701 |
| 6,155,154 A | 12/2000 | Hsu ................. 83/508.3 |
| 6,176,641 B1 | 1/2001 | Schenk ........................ 403/381 |
| 6,450,445 B1 | 9/2002 | Moller |
| 6,571,671 B1 | 6/2003 | Giannetti ........................ 82/160 |
| 6,604,706 B1 | 8/2003 | Bostan |

(Continued)

FOREIGN PATENT DOCUMENTS

EP    1 508 854 A2    2/2005

(Continued)

OTHER PUBLICATIONS

Examination Report from corresponding EP Application No. 07 118 161.4, mailed Dec. 10, 2010, 6 pages.

(Continued)

*Primary Examiner* — Edwin A Young
(74) *Attorney, Agent, or Firm* — Shumaker & Sieffert, P.A.

(57) ABSTRACT

Methods and systems are provided for attaching and detaching a payload device to and from, respectively, a gimbal system without requiring use of a mechanical tool. The gimbal system includes a gimbal assembly that includes a payload socket arranged to attach a payload device to the gimbal assembly. The payload socket is preferably arranged to allow any of a plurality of payload devices to attach to and detach from the payload socket without requiring use of a mechanical tool.

18 Claims, 7 Drawing Sheets

U.S. PATENT DOCUMENTS

| | | |
|---|---|---|
| 6,691,949 B2 | 2/2004 | Plump et al. |
| 6,721,646 B2 | 4/2004 | Carroll |
| 6,789,437 B2 * | 9/2004 | Wyse .............................. 74/5.4 |
| 7,032,861 B2 | 4/2006 | Sanders, Jr. et al. |
| 7,044,422 B2 | 5/2006 | Bostan |
| 7,249,732 B2 | 7/2007 | Sanders, Jr. et al. |
| 2004/0094662 A1 | 5/2004 | Sanders, Jr. et al. |
| 2004/0129828 A1 | 7/2004 | Bostan |
| 2004/0146293 A1 | 7/2004 | DeSorbo et al. |
| 2005/0031335 A1 | 2/2005 | Itzkowitz |
| 2005/0082421 A1 | 4/2005 | Perlo et al. |
| 2006/0049304 A1 | 3/2006 | Sanders, Jr. et al. |
| 2006/0192047 A1 | 8/2006 | Goossen |
| 2006/0231675 A1 | 10/2006 | Bostan |
| 2007/0034738 A1 | 2/2007 | Sanders, Jr. et al. |
| 2007/0051848 A1 | 3/2007 | Mantych et al. |
| 2007/0193650 A1 | 8/2007 | Annati |
| 2007/0221790 A1 | 9/2007 | Goossen |
| 2007/0228214 A1 | 10/2007 | Horak |
| 2007/0244608 A1 | 10/2007 | Rath et al. |
| 2007/0262195 A1 | 11/2007 | Bulaga et al. |
| 2007/0295298 A1 | 12/2007 | Mark |

FOREIGN PATENT DOCUMENTS

| | | |
|---|---|---|
| EP | 1767453 | 6/2008 |
| GB | 2 163 806 A | 3/1986 |
| WO | 0015497 | 3/2000 |
| WO | 01/15285 A1 | 3/2001 |
| WO | 2004002821 | 1/2004 |

OTHER PUBLICATIONS

U.S. Appl. No. 11/338,558, filed Jan. 24, 2006, Goossen et al.

European Search Report from corresponding EP Application No. 07118161.4, mailed Oct. 6, 2010, 3 pages.

Signal AFCEA's International Journal, "Warfighter Technologies Improving a Modern Force", Jun. 2006.

Reply to communication from the Examining Division, for EP Application No. 07118161.4, dated Feb. 25, 2011, 12 pages.

* cited by examiner

METHODS AND SYSTEMS FOR ATTACHING AND DETACHING A PAYLOAD DEVICE TO AND FROM, RESPECTIVELY, A GIMBAL SYSTEM WITHOUT REQUIRING USE OF A MECHANICAL TOOL

PRIORITY

This application claims the benefit of priority of U.S. Provisional Application No. 60/850,597, filed Oct. 10, 2006; the disclosure of which is explicitly incorporated by reference herein.

FIELD

The present invention relates generally to the field of payload mounting systems and, more particularly, relates to gimbal systems that control the orientation of payload devices.

BACKGROUND

Gimbal systems are used in a variety of applications such as surveillance applications, communications applications, and robotics applications. A gimbal system may include a gimbal assembly that is operable to be mounted to a vehicle. A payload device may be attached to the gimbal assembly.

Typically, the gimbal system is adapted to position the payload device in a specific location or orientation and/or hold the payload device in a given position while the vehicle is moving. Positioning and/or holding the payload device may be useful for obtaining navigational information or targeting an object, as examples. Further, if the payload device is a sensor, the information provided by the sensor may be more reliable when the sensor is held steady.

To control the movement of a payload device, the gimbal system may move the payload device in one or more axes of articulation. An axis of articulation may also be referred to as an axis of freedom. Axes of articulation related to gimbal systems typically include one or more of an elevation axis, roll axis, and azimuth axis. The gimbal system may include additional axes as well.

However, gimbal systems are typically designed to attach to a specific type of payload device. Further, gimbal systems do not typically allow for the mechanical replacement of one type of payload device for another type of payload device. If such replacement is possible, the replacement procedure may be time-consuming and/or require specialized tools. This may be problematic for military personnel that require the use of any of a variety of payload-device types, and that may need to quickly replace one payload device for another type of payload device. Further, if specialized tools are required to attach or detach a payload device, then such tools may become lost or damaged.

SUMMARY

Methods and systems are provided for attaching and detaching a payload device to and from, respectively, a gimbal system without requiring use of a mechanical tool. In accordance with an embodiment, a gimbal system is described. The gimbal system includes a gimbal assembly that includes a payload socket arranged to attach a payload device to the gimbal assembly. Preferably, the payload socket is arranged to allow any of a plurality of payload devices to attach to and detach from the payload socket without requiring use of a mechanical tool.

In an example, at least two payload devices in the plurality of payload devices vary in size, shape, and weight from one another. In another example, the plurality of payload devices includes at least two different types of payload devices.

In some examples, the gimbal assembly includes a dovetail insert that is arranged to connect to the payload device, and the payload socket is arranged to attach to the payload device via the dovetail insert. The payload socket and dovetail insert are preferably cooperatively arranged to electrically couple the gimbal system and payload device upon attachment of the payload device and dovetail insert to the payload socket.

In an example, the dovetail insert is arranged to (i) slide into the payload socket and (ii) attach in a fixed position within the payload socket. Upon the dovetail insert being attached in a fixed position within the payload socket, the payload device is preferably provided with an electrical connection to the gimbal system and substantially isolated from vibrational movement.

In an example, the payload socket and dovetail insert are cooperatively arranged as a cam-lock system. In another example, the payload socket and dovetail insert are cooperatively arranged as a spring-lock system. In yet another example, the payload socket and dovetail insert are cooperatively arranged as a lever-lock system.

In some cases, the gimbal assembly includes a gimbal insert arranged to attach the gimbal assembly to a vehicle. Preferably, the gimbal insert is arranged to allow the gimbal assembly to attach to and detach from the vehicle without requiring use of a mechanical tool. The gimbal assembly may further include a gimbal socket connected to the vehicle, and the gimbal socket may be arranged to attach to the gimbal assembly via the gimbal insert.

In an example, the gimbal insert is arranged to (i) slide into the gimbal socket and (ii) attach in a fixed position within the gimbal socket. In some cases, the gimbal insert and gimbal socket are cooperatively arranged as a cam-lock system. In other cases, the gimbal insert and gimbal socket are cooperatively arranged as a spring-lock system. In yet other cases, gimbal insert and gimbal socket are cooperatively arranged as a lever-lock system.

In an example, the gimbal assembly includes a gimbal structure having an L-shape to enable open access to the payload device, thereby facilitating a user to attach and detach the payload device to and from, respectively, the gimbal assembly.

In some examples, the gimbal system further includes a payload-identification routine arranged to detect attachment of a payload device and query the payload device for identification information. In other examples, the gimbal system further includes a connection routine arranged to use at least the identification information as a basis to select at least one driver for the payload device, and to connect the payload device to at least one gimbal control system via the selected driver, thereby enabling communications between the gimbal control system and payload device.

In other examples, the gimbal system further includes a monitoring routine arranged to determine the operational status of the payload device. In yet other examples, the gimbal system further includes a modification routine arranged to modify at least one parameter of the payload device.

In accordance with another embodiment, a method is described. The method includes enabling attachment of a payload device to a gimbal system. Preferably, enabling attachment includes enabling any of a plurality of payload devices to attach to and detach from the gimbal system without requiring use of a mechanical tool. The method further includes detecting attachment of the payload device, obtaining identification information corresponding to the payload device, using at least the identification information as a basis to select at least one driver for the payload device, and connecting the given payload device to at least one gimbal control system via the selected driver, thereby enabling communications between the gimbal control system and the given payload device.

In some cases, the method may further include determining the operational status of the payload device and, perhaps, modifying at least one parameter of the payload device. In an example, the gimbal system includes a gimbal assembly that includes a payload socket and dovetail insert. The dovetail insert may be connected to the payload device, and attaching the payload device to the gimbal system may include attaching the payload socket to the payload device via the dovetail insert.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Embodiments of the present invention are described below in conjunction with the appended drawings. The drawings are only for the purpose of illustrating embodiments of the present invention and are not to be construed as limiting the invention. In the drawings.

DETAILED DESCRIPTION

1. Overview

Figure 1:
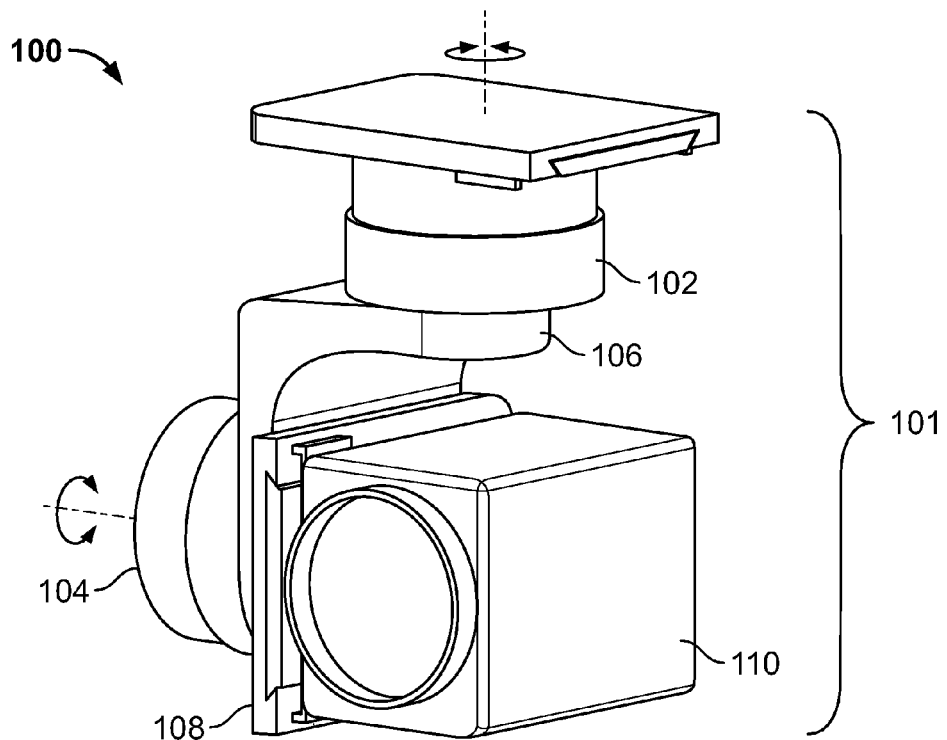
FIG. 1 is an illustration of a gimbal assembly attached to a payload device, according to an example.

As noted, gimbal systems are used in any of a variety of applications. During use, a user may wish detach a given payload device from a gimbal assembly, attach another payload device to the gimbal assembly, and operate the other payload device via the gimbal system. In a surveillance operation, for instance, the payload device may include a camera, and a user operating the gimbal system may wish to replace the camera with a thermal sensor. However, gimbal systems do not typically allow a given payload device to be replaced with another payload device, because the gimbal assembly may not mechanically allow such a replacement and/or the gimbal system may not have a control system operable to support other types of payload devices.

In the case that a gimbal system does allow such replacement, the gimbal system may only allow payload devices of a specific type to be used for replacement. Further, the attachment and detachment procedure of the payload devices may be time consuming and/or require specialized tools. In situations where payload devices need to be replaced quickly, the attachment/detachment procedure may tender the replacement of the payload device impractical.

Methods and systems are provided for allowing a user to quickly detach a given payload device from a gimbal system and attach another payload device to the gimbal system without requiring use of a mechanical tool. The term mechanical tool is intended to encompass any device or instrument that is separate or separable from the gimbal system and that may be used to mechanically facilitate the attachment and/or detachment of a payload device to and from, respectively, the gimbal assembly. Hence, the term mechanical tool does not encompass the gimbal system or structural components of the gimbal assembly, but does encompass, for example, a tool that is separate or separable from the gimbal assembly (e.g., a tool that is not connected to the gimbal assembly, or merely connected to the gimbal assembly via a cord or cable). Further, the term mechanical tool is intended to encompass any device or instrument that incorporates mechanical components, including electrical tools.

The gimbal system preferably provides an attached payload device with mechanical and electrical connections to the gimbal system, and includes routines to enable the gimbal system to detect, recognize, communicate with, and operate the attached payload device. By way of example, the gimbal system may allow a user to detach a given payload device from a gimbal assembly and attach another payload device to the gimbal assembly without requiring use of a mechanical tool. Upon being attached to the gimbal assembly, the payload device is preferably supplied with mechanical and electrical corrections to the gimbal system. Further, the gimbal system preferably includes routines to detect attachment of the payload device, identify the payload device, select at least one driver for the payload device, and connect the payload device to at least one gimbal control system via the selected driver, thereby enabling communications between the gimbal control system and payload device.

2. System Overview

FIG. 1 is an illustration of a gimbal assembly 101 attached to a payload device 110, according to an example. The gimbal assembly 101 may be a component of a gimbal system 100. As shown in FIG. 1, the gimbal assembly 101 includes an azimuth control 102, an elevation control 104, a gimbal structure 106, and a payload socket 108.

It should be understood, however, that this and other arrangements described herein are for purposes of example only. As such, those skilled in the art will appreciate that other arrangements and other elements (e.g. systems, assemblies, controls, structures, payload devices, sockets, inserts, machines, interfaces, and functions) can be used instead, and some elements may be omitted altogether. For example, the gimbal assembly 100 is shown to include two axes of articulation. However, the gimbal assembly 100 may include a single axis of articulation, or more than two axes of articulation.

The payload device 110 may take the form of any of a variety of payload devices, and the payload device 110 may be selected from a plurality of payload devices that includes at least two payload devices that vary in size, shape, and weight from one another. For example, the payload device 110 may be a passive or active payload device. A passive payload device may be adapted to merely observe an object of interest whereas an active payload device may be adapted to affect the object. As examples, the payload device 110 may be a sensor such as a magnetic sensor, seismic sensor, acoustic sensor, optical sensor, chemical sensor, or infrared sensor. As other examples, the payload device 110 may be a weapon such a firearm or laser. Of course, other examples exist for the payload device 110.

The azimuth control 102 may be connected to the gimbal structure 106. The azimuth control 102 generally operates to control movement of the gimbal structure 106 and thus payload device 110 along the azimuth axis. The azimuth control 102 may take any of a variety of configurations. For example, the azimuth control 102 may include a motor such as a servomotor to physically move the gimbal structure 102 and thus payload device 110 along the azimuth axis. The azimuth control 102 may also include an encoder, which may detect the position of the gimbal structure 106 and/or payload device 110 along the azimuth axis. The encoder may take any of a variety of configurations, such as an optical sensor, electrical sensor, or any other type of device used to measure the angular position of gimbal structure 106 and/or payload device 110 along the azimuth axis. Additionally, the azimuth control 102 may include a bearing to allow rotation along the azimuth axis. Of course, other examples exist for the azimuth control 102.

The elevation control 104 may be connected to the gimbal structure 106 and payload socket 108. The elevation control 104 generally operates to control movement of the payload socket 108 and thus payload device 110 along the elevation axis. The elevation control 104 may take any of a variety of configurations. For example, the elevation control 104 may include a motor such as a servomotor to physically move the payload socket 108 and thus payload device 110 along the elevation axis. The elevation control 104 may also include an encoder, which may detect the position of the payload socket 108 and/or payload device 110 along the elevation axis. The encoder may take any of a variety of configurations, such as an optical sensor, electrical sensor, or any other type of device used to measure the angular position of payload socket 108 and/or payload device 110 along the elevation axis. Further, the elevation control 104 may include a bearing to allow rotation along the elevation axis. Of course, other examples exist for the elevation control 104.

The gimbal structure 106 may take any of a variety of configurations. As shown, the gimbal structure includes an L-shapes. The L-shape of the gimbal structure 106 may enable open access or openly expose the payload device 110, thereby facilitating a user to attach and detach the payload device 110 without obstruction. Of course, the gimbal structure 106 may take other shapes and/or include other shapes.

The payload socket 108 is arranged to attach the payload device 110 to the gimbal assembly 101. Preferably, the payload socket 108 is arranged to allow any of a plurality of payload devices to attach to and detach from the gimbal assembly 101 without requiring use of a mechanical tool. The payload socket 108 and thus gimbal assembly 101 may be considered to be attached to the payload device 110 when the payload device is fully engaged within or fully inserted into the payload socket 108. If not fully engaged within or fully inserted into the payload socket 108, the payload device 110 may be considered to be detached from the payload socket 108 and thus gimbal assembly 101.

Figure 2:
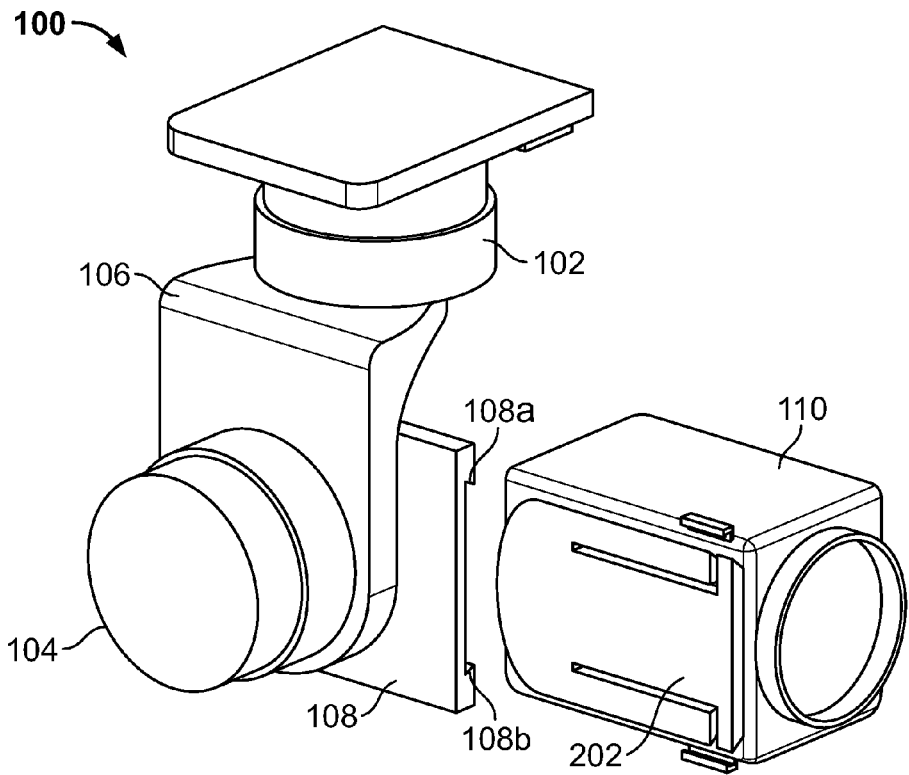
FIG. 2 is an illustration of a gimbal assembly detached from a payload device, according to an example.

The payload socket 108 may attach to the payload device 110 in any of a variety of ways. As examples, the payload socket 108 may attach directly to the payload device 110 or attach to the payload device 110 via an insert. FIG. 2 is an illustration of the gimbal assembly 101 detached from the payload device 110, according to an example. As shown in FIG. 2, the gimbal assembly 101 includes a dovetail insert 202 (or insert, more generally), and the payload device 110 is connected to the dovetail insert 202. The payload socket 108 may attach to the payload device 110 via the dovetail insert 202.

For clarification, the terms "connected" and "attached" as defined throughout are not synonymous. To illustrate, when the payload device 110 is "connected" to the dovetail insert 202, the payload device 110 is in turn "connected" to the gimbal assembly 101 and thus gimbal system 100. Although the payload device 110 is "connected" to the dovetail insert 202 and thus "connected" to the gimbal assembly 101, the payload device 110 is not necessarily "attached" to the gimbal assembly 101. Rather, the payload device 110 is "attached" to the gimbal assembly 101 when the payload device 110 is fully engaged within or fully inserted into the payload socket 108, as shown in FIG. 1. Hence, FIG. 2 depicts the payload device 110 "connected" to the dovetail insert 202, but still "detached" from the gimbal assembly 101.

Preferably, the payload device 110 and dovetail insert 202 are mechanically connected and electrically coupled. The dovetail insert 202 may be mechanically connected to the payload device 110 in any of a variety of ways. For instance, the payload device 110 and dovetail insert 202 may be manufactured as a single unit. Alternatively, the payload device 110 and dovetail insert 202 may be connected with the use of screws, for instance. Of course, other examples exist for mechanically connecting the payload device 110 and dovetail insert 202.

Further, the payload device 110 and dovetail insert 202 may be electrically coupled in any of a variety of ways. As an example, the electrical input and output connections of the payload device 110 may be soldered to the dovetail insert 202 via a wire port. Of course, other examples exist for electrically coupling the payload device 110 and dovetail insert 202.

As noted, the payload socket 108 may attach to the payload device 110 via the dovetail insert 202. The payload socket 108 and dovetail insert 202 may mechanically attach in any of a variety of ways. For example, the dovetail insert 202 may be arranged to (i) slide into the payload socket 108 and (ii) attach in a fixed position within the payload socket 108. In particular, the dovetail insert 202 may act as an insertion guide and location lock for the payload device 110. Upon the dovetail insert 202 being attached in a fixed position within the payload socket 108, the payload device 110 is preferably substantially isolated from vibrational movement.

Additionally, the payload socket 108 and dovetail insert 202 are preferably cooperatively arranged to electrically couple the payload device 110 and gimbal system 100 upon attachment of the payload device 110 and dovetail insert 202 to the payload socket 108. The dovetail insert 202 may provide the proper insertion distance for the payload device 110 such that when the payload device 110 and dovetail insert 202 are attached in the fixed position within the payload socket 108, the payload device 110 is electrically coupled to the gimbal system 100.

Figure 3:
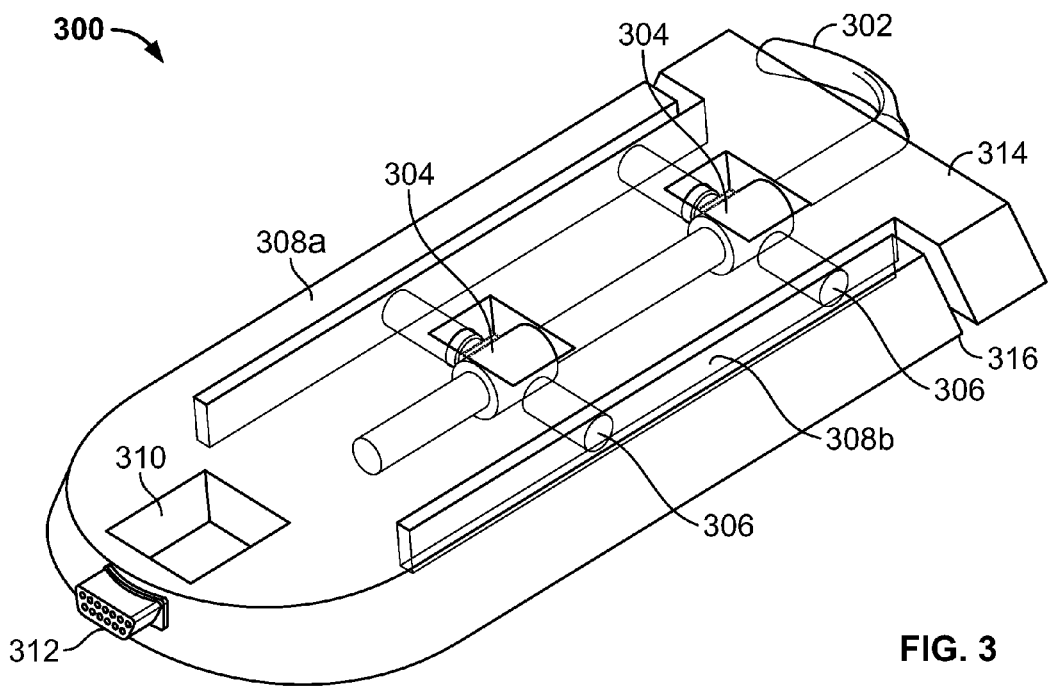
FIG. 3 is an illustration of a cam-lock insert, according to an example.

The payload socket 108 and dovetail insert 202 may take any of a variety of configurations. For example, the payload socket 108 and dovetail insert 202 may cooperatively be arranged as a cam-lock system. FIG. 3 is an illustration of a cam-lock insert 300, according to an example. The dovetail insert 202 may be arranged as the cam-lock insert 300, and the payload socket 108 may be arranged to mechanically attach to the cam-lock insert 300. As shown in FIG. 3, the cam-lock insert 300 includes a cam-lock handle 302, cam 304, cam pins 306, spring tabs 308a and 308b, wire port 310, and male connector 312.

In application, the payload device 110 would be connected to the side 314 of the cam-lock insert 300, and the payload socket 108 would be attached to the side 316 of the cam-lock insert 300. Preferably, the payload device 110 is electrically coupled to the cam-lock insert 300 such that the electrical input and output connections for the payload device 110 are coupled to the male connector 312 via the wire port 310. Hence, when the male connector 312 is electrically coupled to a female connector (not shown) on the payload socket 108 (or gimbal assembly 101, more generally), the payload device 110 is electrically coupled to the gimbal system 100.

As noted, the payload socket 108 may be arranged to mechanically attach to the cam-lock insert 300. In particular, the edges 108a and 108b of the payload socket 108 (as shown in FIG. 2) may be adapted, modified, and/or configured to couple to the cam-lock insert 300. To illustrate, when inserted into the payload socket 108, the spring tabs 308a and 308b of the cam-lock insert 300 may be adjacent to the edges 108a and 108b, respectively, and each of the spring tabs 308a and 308b may apply pressure and/or friction to the edges 108a and 108b, respectively. The pressure and/or friction between the spring tabs 308a and 308b and the edges 108a and 108b, respectively, preferably mechanically secures the payload device 110 to the payload socket 108 when the payload device 110 is fully engaged within or fully inserted into the payload socket 108.

In operation, a user would slide the cam-lock insert 300 into the payload socket 108. In this example, the portion of the cam-lock insert 300 including the male connector 312 would slide first into the payload socket 108. Preferably, the user would slide the cam-lock insert 300 into the payload socket 108 until the male connector 312 mates with the associated female connector on the payload socket 108. Upon the male connector 312 and female connector mating, the payload device 110 is electrically coupled to the gimbal system 100.

After sliding the cam-lock insert 300 into the payload socket 108 and causing the male connector 312 and associated female connector to mate, the user may apply a given torque to the cam-lock handle 302 (i.e., turn the cam-lock handle 302 in a given direction). The turned cam-lock handle 302 will cause the cam 304 to turn in such a way to push the cam pins 306 away from one another. And the pushed cam pins 306 will in turn push the spring tabs 308a and 308b away from one another. The pushed spring tabs 308a and 308b will apply pressure and/or friction to the edges 108a and 108b, respectively, of the payload socket 108. The respective pressure and/or friction between the spring tabs 308a and 308b and edges 108a and 108b will preferably mechanically secure the cam-lock insert 300 within the payload socket 108, and further substantially isolate the payload device 110 from vibrational movement. Hence, when the cam-lock insert 300 is secured within the payload socket 108 in such a manner, the payload device 110 is mechanically attached and electrically coupled to the gimbal system 100.

To detach the cam-lock insert 300, the user would apply an opposite torque to the cam-lock handle 302 (i.e., turn the cam-lock handle 302 in a direction opposite to that of the given direction). The turned cam-lock handle 302 will cause the cam 304 to turn in such a way to pull the cam pins 306 toward one another, thus releasing pressure from the spring tabs 308a and 308b. Upon releasing pressure from the spring tabs 308a and 308b, the pressure and/or friction between the spring tabs 308a and 308b and edges 108a and 108b, respectively, will be reduced to such a point where the user can relatively easily pull the cam-lock insert 300 from the payload socket 108. Of course, other examples exist for the cam-lock insert 300.

Figure 4:
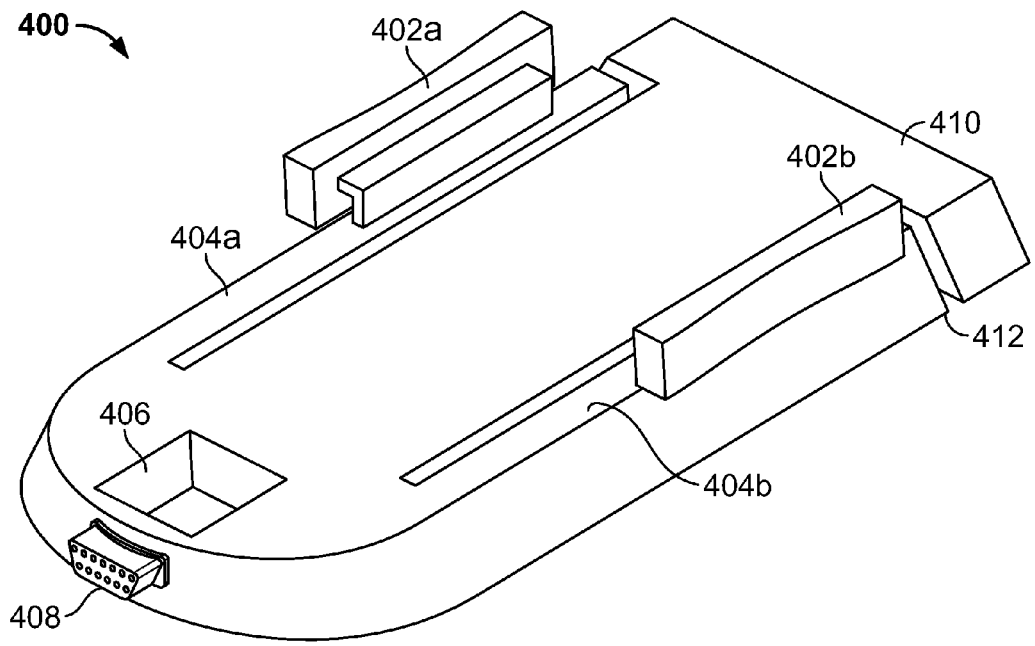
FIG. 4 is an illustration of a spring-lock insert, according to an example.

As another example, the payload socket 108 and dovetail insert 202 may cooperatively be arranged as a spring-lock system. FIG. 4 is an illustration of a spring-lock insert 400, according to an example. The dovetail insert 202 may be arranged as the spring-lock insert 400, and the payload socket 108 may be arranged to mechanically attach to the spring-lock insert 400. As shown in FIG. 4, the spring-lock insert 400 includes thumb tabs 402a and 402b, spring tabs 404a and 404b, wire port 406, and male connector 408.

In application, the payload device 110 would be connected to the side 410 of the spring-lock insert 400, and the payload socket 108 would be attached to the side 412 of the spring-lock insert 400. Preferably, the payload device 110 is electrically coupled to the spring-lock insert 400 such that the electrical input and output connections for the payload device 110 are coupled to the male connector 408 via the wire port 406. Hence, when the male connector 312 is electrically coupled to a female connector (not shown) on the payload socket 108, the payload device 110 is electrically coupled to the gimbal system 100.

As noted, the payload socket 108 may be arranged to mechanically attach to the spring-lock insert 400. In particular, the edges 108a and 108b of the payload socket 108 may be adapted, modified, and/or configured to couple to the spring-lock insert 400. For example, when inserted into the payload socket 108, the spring tabs 404a and 404b of the spring-lock insert 400 may be adjacent to the edges 108a and 108b, respectively, and each of the spring tabs 404a and 404b may apply pressure and/or friction to the edges 404a and 404b, respectively. The pressure and/or friction between the spring tabs 404a aid 404b and the edges 108a and 108b, respectively, preferably mechanically secures the payload device 110 to the payload socket 108 when the payload device 110 is fully engaged within or fully inserted into the payload socket 108.

In operation, a user would slide the spring-lock insert 400 into the payload socket 108. In this example, the portion of the spring-lock insert 400 including the male connector 408 would slide first into the payload socket 108. Preferably, the user would slide the spring-lock insert 400 into the payload socket 108 until the male connector 408 mates with the associated female connector on the payload socket 108. Upon the male connector 408 and female connector mating, the payload device 110 is electrically coupled to the gimbal system 100.

A user would slide the spring-lock insert 400 into the payload socket 108 by first squeezing the thumb tabs 402a and 402b toward one another Squeezing the thumb tabs 402a and 402b toward one another will responsively cause the spring tabs 404a and 404b to move away from one another, thus reducing any pressure and/or friction between the spring tabs 404a and 404b and edges 108a and 108b, respectively. Hence, the user may slide spring-lock insert 400 into the payload socket 108 without much friction or resistance.

The user may slide the spring-lock insert 400 into the payload socket 108 until the male connector 408 mates with the associated female connector. After doing so, the user may release pressure from the thumb tabs 402a and 402b. Releasing pressure from the thumb tabs 402a and 402b will responsively cause the spring tabs 404a and 404b to move toward one another, thus creating pressure and/or friction between the spring tabs 404a and 404b and edges 108a and 108b, respectively. The respective pressure and/or friction between the spring tabs 404a and 404b and edges 108a and 108b will preferably mechanically secure the spring-lock insert 400 within the payload socket 108, and further substantially isolate the payload device 110 from vibrational movement. Hence, when the spring-lock insert 400 is secured within the payload socket 108 in such a manner, the payload device 110 is mechanically attached to and electrically coupled to the gimbal system 100.

To detach the spring-lock insert 400 from the payload socket 108, the user would squeeze the thumb tabs 402a and 402b toward one another. Squeezing the thumb tabs 402a and 402b toward one another will responsively cause the spring tabs 404a and 404b to move away from one another, thus reducing any pressure and/or friction between the spring tabs 404a and 404b and edges 108a and 108b, respectively. Hence, the user may slide spring-lock insert 400 out of the payload socket 108 without much friction or resistance. Of course, other examples exist for the spring-lock insert 400.

Figure 5A:
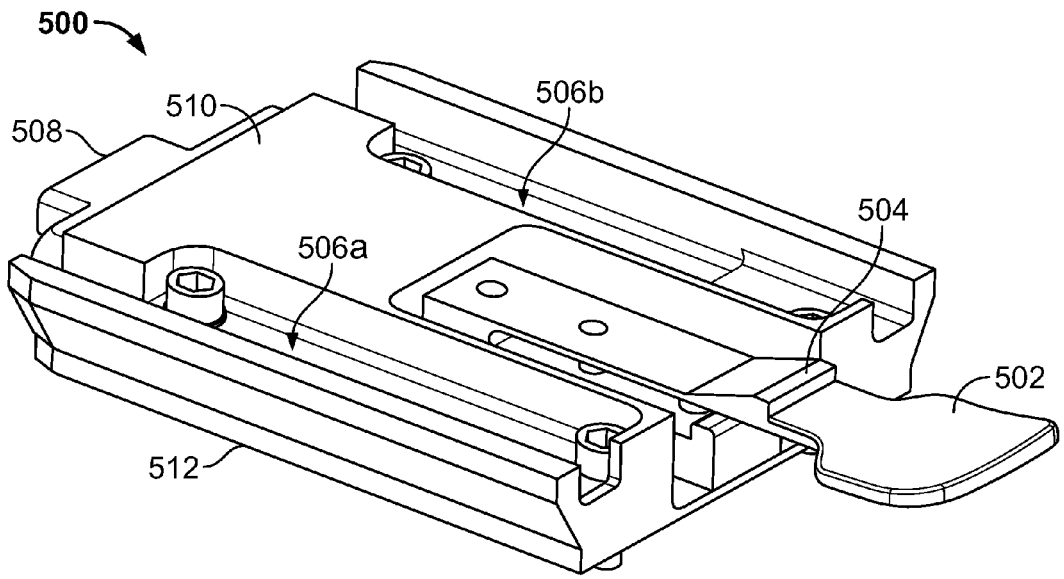
FIGS. 5A and 5B are illustrations of a lever-lock insert and lever-lock socket, respectively, according to examples.
Figure 5B:
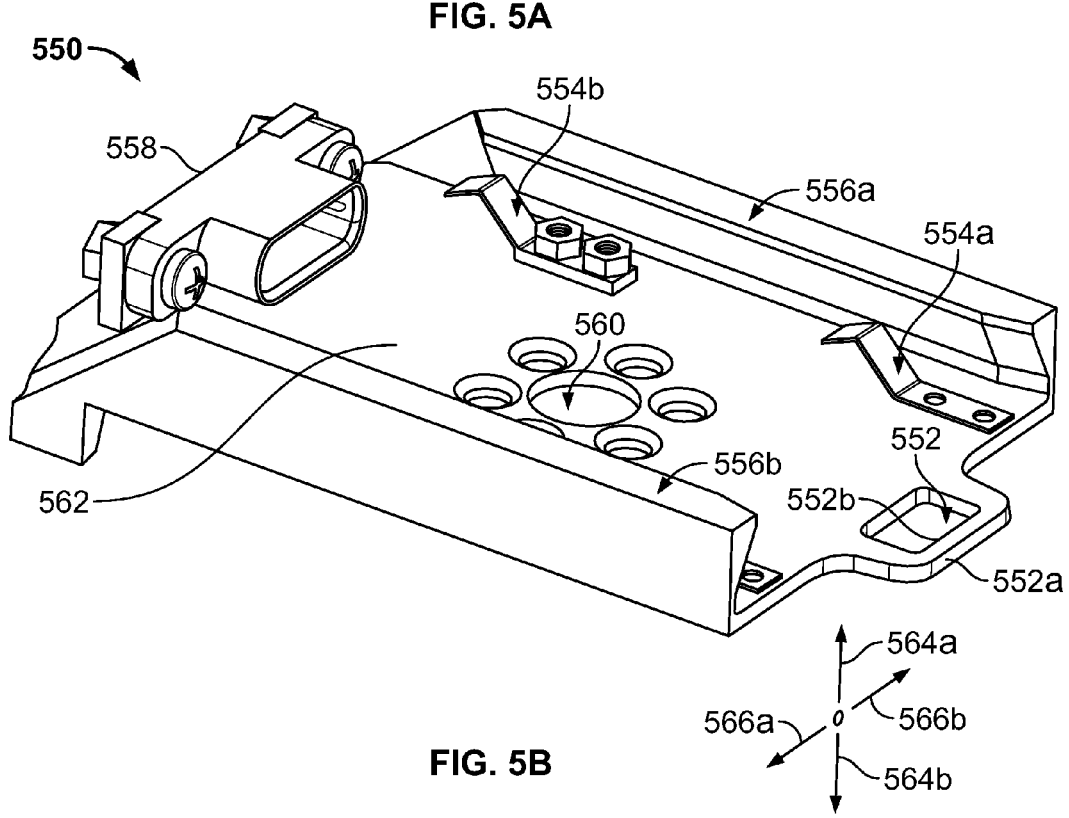

In yet another example, the payload socket 108 and dovetail insert 202 may cooperatively be arranged as a lever-lock system. FIGS. 5A and 5B are illustrations of a lever-lock insert 500 and lever-lock socket 550, respectively, according to examples. The dovetail insert 202 may be arranged as the lever-lock insert 500, and the payload socket 108 may be arranged as the lever-lock socket 550.

As shown in FIG. 5A, the lever-lock insert 500 includes lever 502, taper 504, grooves 506a and 506b, and male connector 508. As shown in FIG. 5B, the lever-lock socket 550 includes release catch 552, pressure springs 554a and 554b, edges 556a and 556b, female connector 558, and control opening 560.

In application, the payload device 110 would be connected to the side 512 of the lever-lock insert 500. And the side 510 of the lever-lock insert 500 would attach to the side 562 of the lever-lock socket 550. Preferably, the payload device 110 is electrically coupled to the lever-lock insert 500 such that the electrical input and output connections for the payload device 110 are coupled to the male connector 508. Hence, when the male connector 508 is electrically coupled to the female connector 558, the payload device 110 is electrically coupled to the gimbal system 100.

In this example, the portion of the lever-lock insert 500 including the male connector 508 would slide first into the lever-lock socket 550. Preferably, the user would slide the lever-lock insert 500 into the lever-lock socket 550 until the male connector 508 mates with the female connector 558. Upon the male connector 506 and female connector 558 mating, the payload device 110 is electrically connected to the gimbal system 100.

In operation, as the user slides the lever-lock insert 500 into the lever-lock socket 550, the grooves 506a and 506b of the lever-lock insert 500 track along the edges 556a and 556b, respectively. As the lever-lock insert 500 is guided into the lever-lock socket 550, the lever-lock insert 500 would cause the pressure springs 554a and 554b to flatten. The flattened pressure springs 554a and 554b preferably create enough tension between the lever-lock insert 500 and lever-lock socket 550 to substantially prevent movement of the insert 500 and socket 550 along the directions 566a and 566b. Also, when the lever-lock insert 500 and lever-lock socket 550 are fully engaged, the flattened pressure springs 554a and 554b also help maintain contact between the male connector 508 and female connector 558 when heavy payload devices are connected to the gimbal assembly 101 and/or when the vehicle accelerates and decelerates quickly.

As the lever-lock insert 500 is guided into the lever-lock socket 550, the lever 502 tracks along the outer edge 552a of the release catch 552. The lever 502 is preferably arranged in such a way that when the lever 502 is pushed in the direction 564a, the lever 502 creates a force in the opposite direction 564b. When the taper 504 reaches the outer edge 552a of the release catch 552, the lever 502 is forced in the direction 564a. As the taper 504 clears the outer edge 552a and reaches the inner edge 552b of the release catch 552, the force created by the lever 502 causes the taper 504 to snap into place within the release catch 552. At this point, the lever-lock insert 500 is preferably fully engaged within the lever-lock socket 550 and the male connector 508 is mated with the female connected 558. As such, the payload device 110 is mechanically attached to and electrically coupled to the gimbal system 100.

To detach the lever-lock insert 500 from the lever-lock socket 550, the user would press the lever 502 in the direction 564a until the taper 504 clears the inner edge 552b of the release catch 552. The user may then slide the lever-lock insert 500 out of the lever-lock socket 550. Of course, other examples exist for the lever-lock insert 500 and lever-lock socket 550. Additionally, any of the cam-lock, spring-lock, and lever-lock systems may be combined in any manner. Of course, other examples exist for the payload socket 108 and dovetail insert 202.

Figure 6:
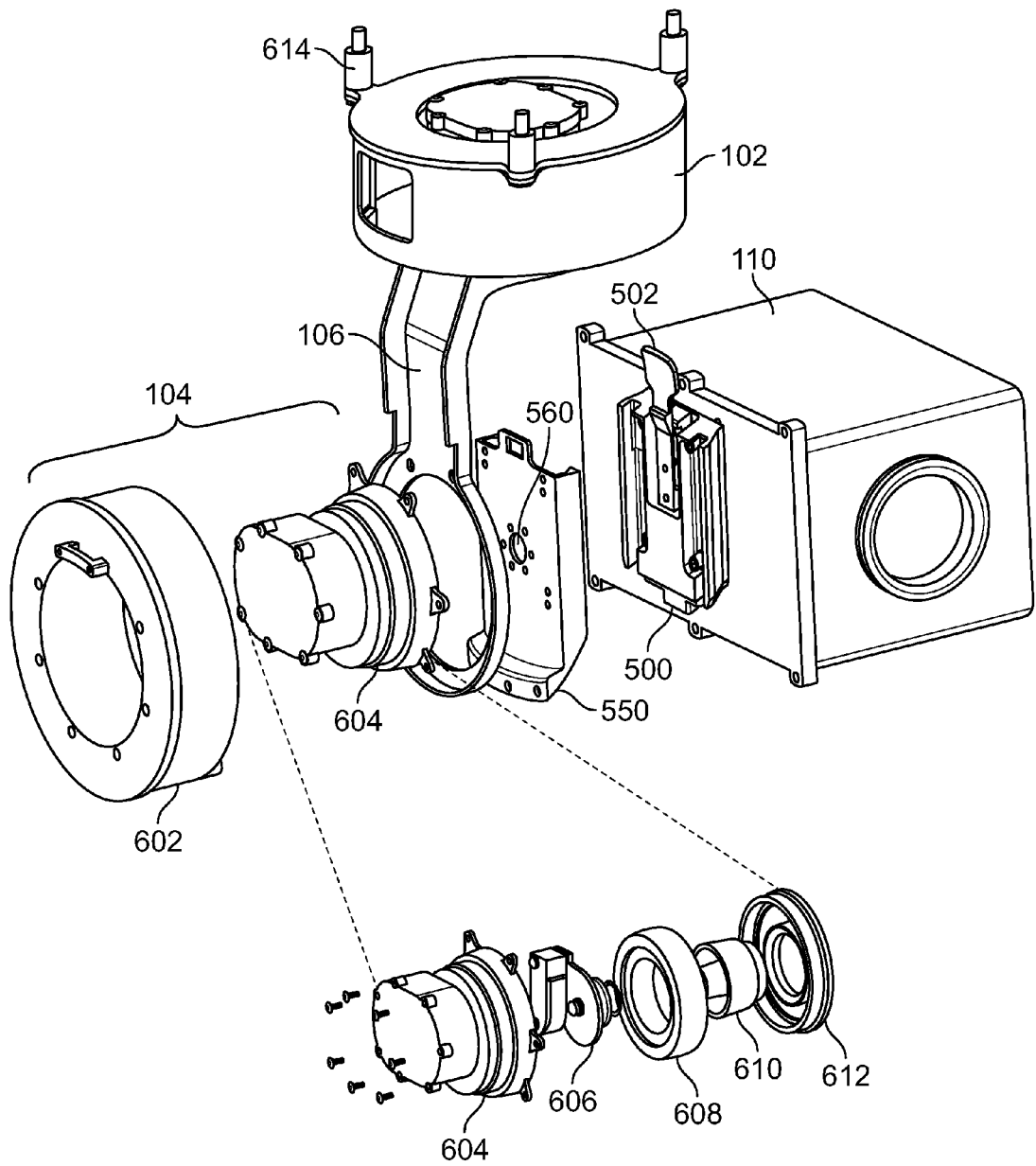
FIG. 6 is an illustration of a gimbal assembly incorporating use of a lever-lock system, according to an example.

FIG. 6 is an illustration of the gimbal assembly 101 incorporating use of a lever-lock system, according to an example. As shown, FIG. 6 includes the payload device 110, lever-lock insert 500, lever-lock socket 550, gimbal structure 106, azimuth control 102, and elevation control 104.

As shown, the azimuth control includes isolators 614. The isolators 614 may help isolate the gimbal structure 106 from the vehicle so as to prevent vibrational movement of the payload device 110 when the vehicle vibrates.

Also as shown, the elevation control 104 includes a coil-wrap housing 602 and motor/encoder housing 604. The coil-wrap housing 602 may contain and protect a coil of wire that spools and unspools as elevation-axis rotation occurs. The wiring may contain an electrical interface to the payload device 110. The wiring may be brought from the azimuth coil wrap in the elevation structure and harness channel of the gimbal structure 106. A similar coil wrap system may be employed along the azimuth axis. Of course, rather than a coil wrap, other devices may be used for protecting rotating wiring such as a slip ring and "buggy whip".

The motor/encoder housing 604 houses an encoder 606, motor 608, bearing 610, and casing 612. The encoder 606, motor 608, and bearing 610 cooperatively control movement of the payload device 110 along the elevation axis. In particular, when the lever-lock insert 500 is fully engaged within the lever-lock socket 550, the control opening 560 is positioned in such a way to provide an opening for the bearing 610 to attach to the payload device 110 and thus control movement of the payload device 110 along the elevation axis. The control opening 560 may include a mounting screw pattern by which to attach the female connector 558 to a motor casing. Of course, other examples exist for the gimbal assembly 101 incorporating a lever-lock system.

Figure 7:
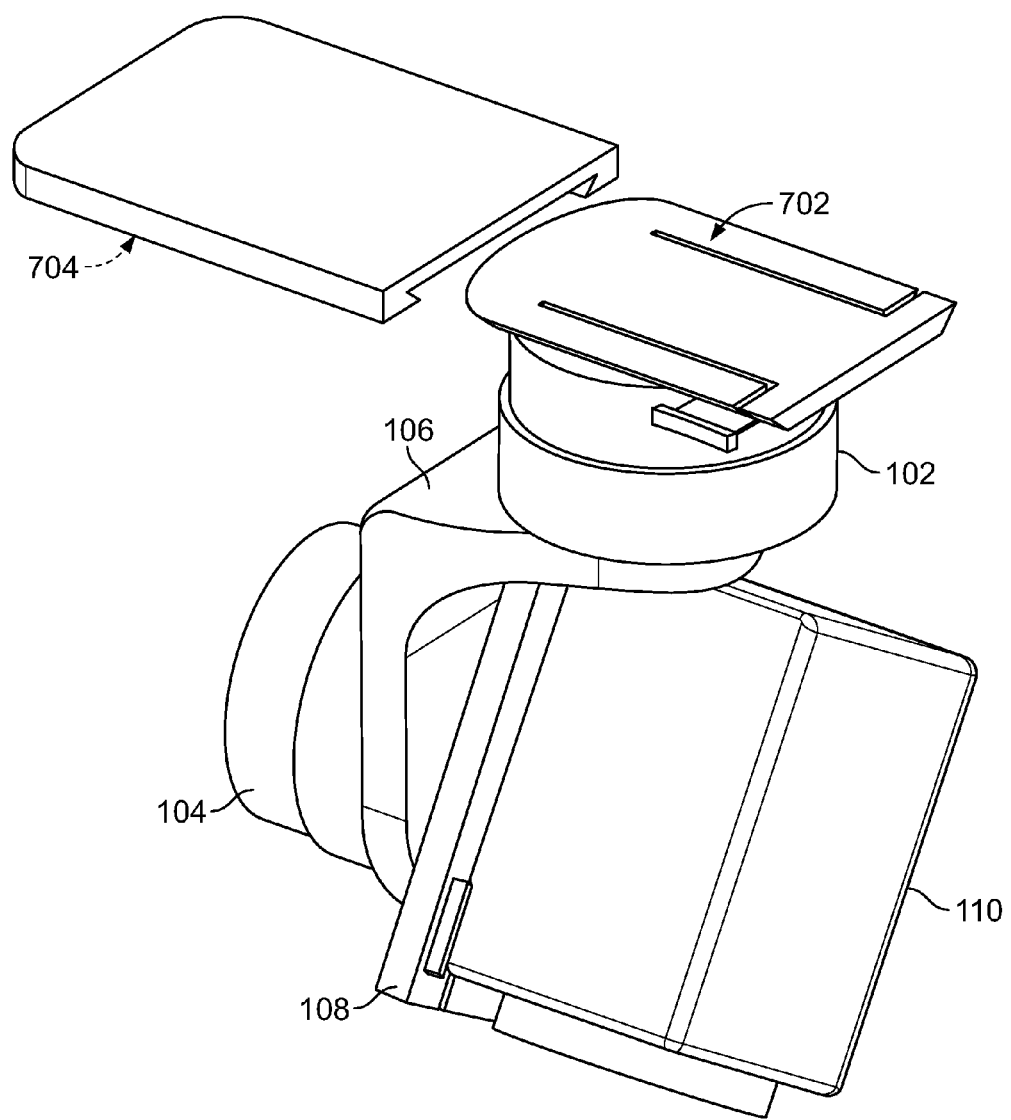
FIG. 7 is an illustration of a gimbal assembly to be attached to a vehicle, according to an example.

In addition to allowing any of a variety of payload devices to attach to and detach from the gimbal assembly 101, the gimbal assembly 101 may be arranged to attach to and detach from any of a variety of vehicles. Preferably, the gimbal assembly 101 is arranged to attach to and detach from any of a variety of vehicles without requiring use of a mechanical tool. FIG. 7 is an illustration of the gimbal assembly 101 to be attached to a vehicle (not shown), according to an example. As shown in FIG. 7, the gimbal assembly 101 includes the azimuth control 102, elevation control 104, gimbal structure 106, payload socket 108, gimbal insert 702, and gimbal socket 704.

The gimbal socket 704 is preferably connected to the vehicle. The gimbal socket 704 may be connected to a vehicle in any of a variety of ways. For example, the gimbal socket 704 may be screwed to the vehicle or connected in any other way. Additionally, the gimbal socket 704 may be connected to any of a variety of vehicles, such as a land-based vehicle, water-based vehicle, and/or air-based vehicle. In a preferred embodiment, the gimbal socket 704 is connected to an unmanned aerial vehicle (UAV).

The gimbal assembly 101 may be electrically coupled to the gimbal insert 702, and the gimbal insert 702 is preferably arranged to mechanically attach to and electrically couple with the gimbal socket 704. Hence, when the gimbal insert 702 fully engages within the gimbal socket 704, the gimbal assembly 101 is electrically coupled to the vehicle.

The gimbal insert 702 may be substantially similar to the dovetail insert 202, and the gimbal socket 704 may be substantially similar to the payload socket 108. The gimbal insert 702 may be arranged to (i) slide into the gimbal socket 704 and (ii) attach in a fixed position within the gimbal socket 704. Further, the gimbal insert 702 and gimbal socket 704 may cooperatively be arranged as a cam-lock system, spring-lock system, a lever-lock system, any other system, or any combination of the above systems.

3. Example of a Gimbal System

Once the payload device 110 is attached to the gimbal assembly 101 and thus gimbal system 100, the gimbal system 100 is preferably operable to detect, identify, communication with, and operate the payload device 110. To such an extent, the gimbal system 100 may include hardware, software, and/or firmware components to execute such functions.

Further, the vehicle with which the gimbal system 100 is associated may include an on-board and/or remote system that includes hardware, software, and/or firmware components that work in conjunction with the gimbal system 100. As an example, the vehicle's on-board and/or remote system may include a directional pad operable to control movement of the gimbal assembly 101 and thus payload device 110, and a display operable to provide an indication of data gathered by the payload device 110, as examples.

The gimbal system 100 may be integrated in whole or in part with the vehicle's on-board and/or remote system. As used throughout, the term gimbal system 100 may include hardware, software, and/or firmware components of the gimbal system 100, and/or hardware, software, and/or firmware components of the vehicle's on-board and/or remote system that are associated with, either directly or indirectly, the functioning of the gimbal architecture (e.g., gimbal control systems used to control movement of the gimbal assembly 101 and communicate with the payload device 110).

Figure 8:
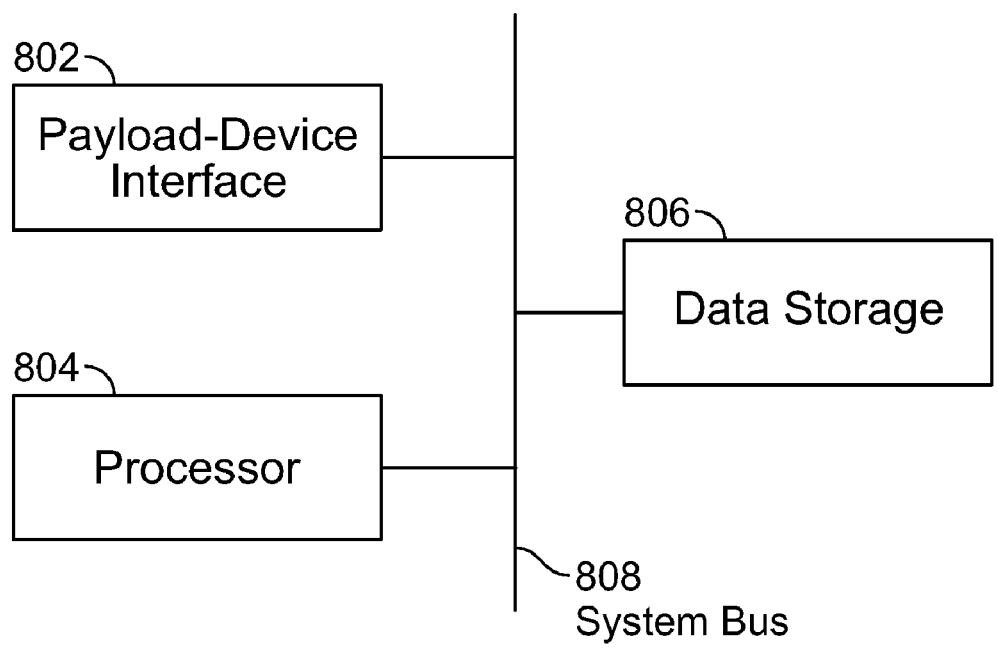
FIG. 8 is a block diagram of gimbal system, according to an example.

FIG. 8 is a block diagram of the gimbal system 100, according to an example. As shown, the gimbal system 100 includes a payload-device interface 802, processor 804, and data storage 806, all linked together via a system bus, network, or other connection mechanism 808.

The payload-device interface 802 provides an interface between the payload device 110 and other portions of the gimbal system 100. The payload interface 802 may include any of a variety of elements to mechanically attach and electrically couple the payload device 110 to the gimbal system 100. Further, the payload-device interface 802 may include any of a variety of elements and/or control systems to mechanically control the movement of the payload device 110 in any of a variety of axes of articulation, communicate with the payload device 110, and/or modify parameters of the payload device 110.

The processor 804 may include one or more processors (e.g., one or more general-purpose processors and/or one or more specialized processors). The processor 804 may be integrated in whole or in part with a vehicle's on-board processor, or may function separately from the vehicle's on-board processor, as examples. The processor 804 is arranged to carry out functions described herein, and may do so by executing computer-readable program instructions stored in data storage 806 and/or in firmware. In response to executing the program instructions, the processor 804 may interact with the payload interface 802 and/or the connection mechanism 808 to carry out functions described herein.

Data storage 806 may store various types of data. Data storable on data storage 806 may comprise a computer-readable medium. The computer-readable medium may comprise volatile and/or non-volatile storage components, such as optical, magnetic, organic, flash, or other memory or disc storage. The computer-readable medium of data storage 806 may be integrated in whole or in part with the processor 804.

Data storable on data storage 806 may be arranged as program instructions executable by the processor 804. As an example, program instructions executable by the processor 804 may include instructions to: (i) detect attachment of a payload device; (ii) obtain identification information corresponding to the payload device; (iii) use at least the identification information of the given payload device as a basis to select at least one driver for the payload device; (iv) connect the payload device to at least one gimbal control system via the selected driver, thereby enabling communications between the gimbal control system and payload device; (v) determine the operational status of the payload device; and (vi) modify at least one parameter of the payload device. Of course, other examples of program instructions stored on data storage 806 executable by processor 804 are also possible.

Data storage 806 may store reference data as well. The reference data may take any of a variety of forms. For example, the reference data may include a registry that may be referenced to identify a payload device and/or correlate the payload device to corresponding drivers and/or gimbal control systems.

The reference data may also include any of a variety of routines. For example, the reference data may include a payload-identification routine arranged to detect attachment of a payload device and query the payload device for identification information. As another example, the reference data may include a connection routine arranged to use at least the identification information as a basis to select at least one driver for the payload device, and to connect the payload device to at least one gimbal control system via the selected driver, thereby enabling communications between the gimbal control system and payload device. As yet another example, the reference data may include a monitoring routine arranged to determine the operational status of the payload device. As still yet another example, the reference data may include a modification routine arranged to modify at least one parameter of the payload device. Of course, data storage 806 may store other types of data as well. And other examples exist for the gimbal system 100.

4. Methodology a. Overview

Figure 9:
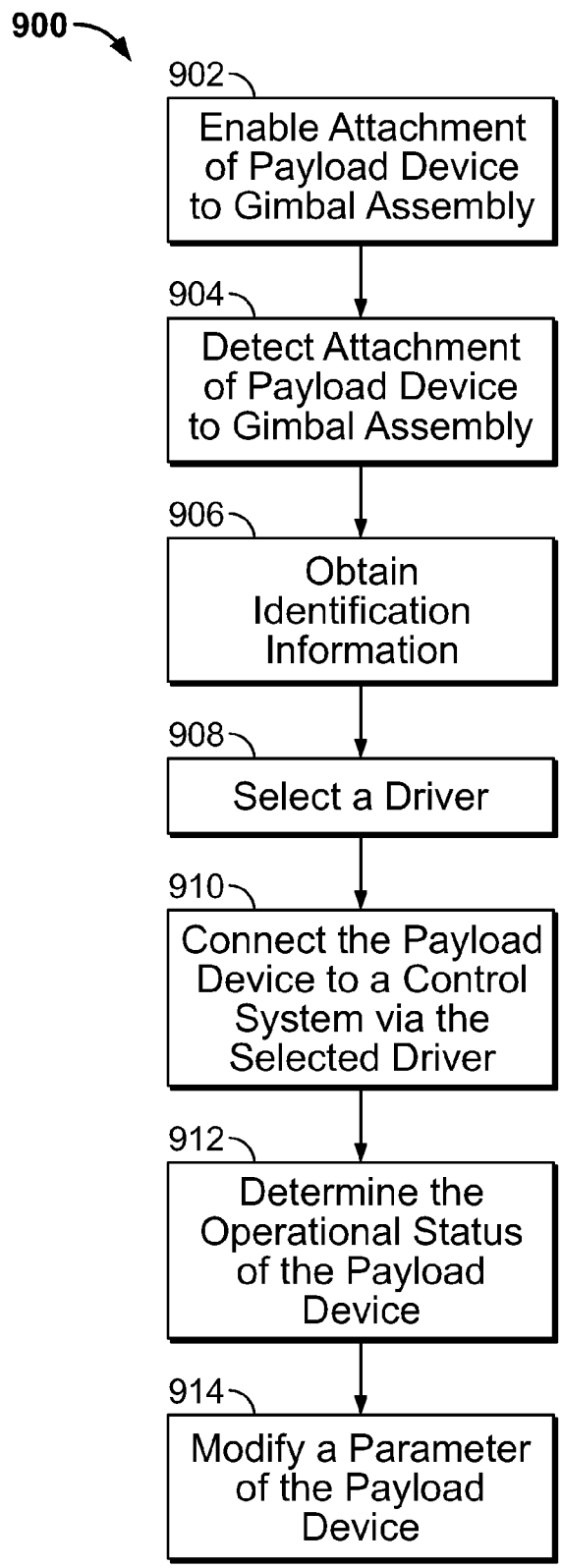
FIG. 9 is a flow chart of a method for carrying out an embodiment of the present invention, according to an example.

FIG. 9 is a flow chart of a method 900 for carrying out an embodiment of the present invention, according to an example. Two or more of the functions shown in FIG. 9 may occur substantially simultaneously. Further, not all of the functions shown in FIG. 9 are required in order to carry out the method 900.

When the gimbal system 100 is turned on, the gimbal system 100 may perform a self-test to determine that the gimbal system components such as motors, one or more positioning systems, and one or more communications systems are all operational. If the self-test indicates that the system is properly functioning, a bit may enable the gimbal system 100 to become operational. Once operational, or perhaps before becoming operational (e.g., while the gimbal system 100 is turned off), a user may attach any of a plurality of payload devices to the gimbal assembly 101.

Once a given payload device is attached, the method includes detecting attachment of the given payload device, obtaining identification information corresponding to the given payload device, using at least the identification information as a basis to select at least one driver for the given payload device, and connecting the given payload device to at least one gimbal control system via the selected driver, thereby enabling communications between the gimbal control system and given payload device. The method 900 may further include determining the operational status of the given payload device and/or modifying at least one parameter of the given payload device.

b. Method Steps

At block 902, the method 900 includes enabling attachment of the payload device 110 to the gimbal system 100. Preferably, enabling attachment includes enabling any of a plurality of payload devices to be connected to the gimbal system 100 without requiring use of a mechanical tool. At least two payload devices in the plurality of payload devices may vary in size, shape, and weight from one another. Further, the plurality of payload devices may include different types of payload devices. As an example, the plurality of payload devices may include active payload devices and passive payload devices. As another example, the plurality of payload devices may include sensors, cameras, and weapons. As yet another example, the plurality may include one or more payload devices that include a combination of the above device types.

The payload device 110 may be attached to the gimbal system 100 in any of a variety of ways. For example, the payload socket 108 may be attached directly to the payload device 110. Alternatively, the payload socket 108 may attach to the payload device 110 via an insert. For example, as shown in FIG. 2, the payload device 110 is connected to a dovetail insert 202, and the payload socket 108 may attach to the payload device 110 via the dovetail insert 202.

The payload socket 108 and dovetail insert 202 may connect in any of a variety of ways. For example, the dovetail insert 202 may be arranged to (i) slide into the payload socket 108 and (ii) attach in a fixed position within the payload socket 108. Hence, the dovetail insert 202 may act as an insertion guide and location lock for the payload device 110. Upon the dovetail insert 202 being attached in a fixed position within the payload socket 108 (upon attachment of the payload device 110 and dovetail insert 202 to the payload socket 108), the payload device 110 is preferably electrically coupled to the gimbal system 100, and substantially isolated from vibrational movement.

Further, the payload socket 108 and dovetail insert 202 may take any of a variety of configurations. For example, the payload socket 108 and dovetail insert 202 may cooperatively be arranged as a cam-lock system, spring-lock system, lever-lock system, any other system, or any combination of the above systems.

At block 904, the method 900 includes detecting attachment of the payload device 110. In particular, the gimbal system 100 may detect electrical contact between a female connector on the payload socket 108 and male connector of an unknown device. The payload device 110 may be unknown to the gimbal system 100 at this point, because the interface between the gimbal system 100 and payload device 110 may not be enabled. Hence, the gimbal system 100 may detect the payload device 110, but may not recognize the device.

At block 906, the method 900 includes obtaining identification information corresponding to the payload device 110. The gimbal system 100 may obtain such identification information in any of a variety of ways. For example, the gimbal system 100 may transmit an identification request to the payload device 110, and the payload device 110 may responsively transmit identification data to the gimbal system 100. The identification data may include, as examples, manufacturer data, part-number information, communication-protocol information, address-port information, driver information, and perhaps other information.

As another example, the identification information may provide an indication as to the control-loop parameters for the payload device 110. The control-loop parameters may indicate which settings of the payload device 110 may be adjusted. For example, the control-loop parameters may indicate that the payload device 110 is a camera with adjustable parameters relating to a frame-rate setting, an iris setting, a zoom setting, and night-vision capabilities. As another example, the control-loop parameters may indicate that the payload device 100 is a thermal sensor with adjustable parameters relating to one or more threshold parameters. As yet another example, the control-loop parameters may indicate that the payload device 110 is a weapon with an adjustable rate-of-fire. Of course, other examples exist for the identification information and/or control-loop parameters. For instance, the identification information may not include control-loop parameters, and the control-loop parameters may be sent in a separate transmission at a different time.

The gimbal system 100 may then compare the received identification information to its registry and determine whether the payload device 110 is an authorized payload device. If determined to be an authorized payload device, the gimbal system 100 may assign and/or dedicate one or more address ports for communications with the payload device 110.

And if authorized, the gimbal system 100 may measure the mass and weight distribution of the payload device 110. Alternatively, rather than measuring such information, the identification information may include the mass and weight-distribution information. Based on the mass and weight-distribution information, the gimbal system 100 may accordingly adjust power to the azimuth control 102, elevation control 104, and perhaps other controls in the gimbal assembly 101 to accordingly facilitate mechanical control of the payload device 110. Of course, the gimbal system 100 may measure or receive the mass and weight distribution and/or adjust power to the various controls of the gimbal assembly 101 at other points as well.

At block 908, the method 900 includes using at least the identification information as a basis to select at least one driver for the payload device 100. The gimbal system 100 may select the one or more drivers for the payload device 100 in any of a variety of ways. For example, the gimbal system 100 may locally store the one or more drivers and select the appropriate drivers from data storage 806. Additionally or alternatively, the gimbal system 100 may receive the one or more drivers from the payload device 110.

A given driver may provide an interface between an adjustable payload-device parameter and corresponding gimbal control system. For example, if the payload device 110 is a camera with an adjustable zoom setting and frame rate, then the gimbal system 100 may select one or more drivers associated with adjusting the zoom-setting and frame-rate parameters. As another example, if the payload device 110 is a sensor with an adjustable threshold parameter, then the gimbal system 100 may select one or more drivers associated with adjusting the threshold parameter.

Depending on the selected drivers, the gimbal system 100 may then initiate framing for communications between the gimbal system 100 and payload device 110. Framing may include determining the length of a given frame (e.g., 8 bits or 1024 bits) and setting a frame rate, as examples.

At block 910, the method 900 includes connecting the given payload device to at least one gimbal control system via the selected driver, thereby enabling communications between the gimbal control system and given payload device 100. As an example, if the payload device 110 is a camera that includes an adjustable zoom setting, the gimbal control system may be a combination of hardware, software, and/or firmware operable to adjust the zoom-setting parameter for the camera. Upon connecting at least one gimbal control system to the payload device, the gimbal system 100 may be operable to receive information from and send information to the payload device 110 and, therefore, control operation of the payload device 110.

At block 912, the method 900 includes determining the operational status of the payload device 110. Determining the operational status of the payload device 110 (otherwise known as fault monitoring) may include running one or more tests to determine whether the payload device 110 is functioning correctly. For example, the gimbal system 100 may test a component of the payload device 110 (e.g., a night-vision setting) by sending to the payload device 110 a test signal corresponding to the payload-device component, receiving a response signal from the payload device 110, and comparing the response signal to a threshold parameter. If the response signal exceeds the threshold parameter, for example, then the gimbal system 100 may determine that the payload-device component is functioning correctly. Alternatively, if the response signal does not exceed the threshold parameter, then the gimbal system 100 may determine that the payload-device component is not functioning correctly. Of course, other examples exist for determining the operational status of the payload device 110.

At block 914, the method 900 includes modifying at least one parameter of the payload device 110. For example, the gimbal system 100 may modify a zoom-setting parameter if the payload device 110 is a camera with a zoom function, or a rate-of-fire parameter if the payload device 110 is a firearm with an adjustable rate-of-fire. Of course, other examples exist for modifying a parameter of the payload device 110.

5. Conclusion

Methods and systems have been provided for allowing a user to quickly detach a given payload device from a gimbal system and attach another payload device to the gimbal system without use of a mechanical tool. Upon being attached, the payload device is preferably electrically coupled to the gimbal system. Further, the gimbal system preferably includes routines to enable the gimbal system to detect, recognize, communicate with, and operate the payload device.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

We claim:

1. A gimbal system comprising:
   a gimbal assembly that includes:
   a dovetail insert that is arranged to connect to a payload device; and
   a payload socket arranged to attach the payload device to the gimbal assembly via the dovetail insert,
   wherein the payload socket and dovetail insert are cooperatively arranged to electrically couple the gimbal system and payload device upon attachment of the payload device and dovetail insert to the payload socket, and
   wherein the payload socket is arranged to allow any of a plurality of payload devices to attach to and detach from the payload socket without requiring use of a mechanical tool.

2. The gimbal system of claim 1, wherein the dovetail insert is arranged to (i) slide into the payload socket and (ii) attach in a fixed position within the payload socket.

3. The gimbal system of claim 2, wherein upon the dovetail insert being attached in a fixed position within the payload socket, the payload device is electrically coupled to the gimbal system.

4. The gimbal system of claim 2, wherein upon the dovetail insert being attached in a fixed position within the payload socket, the payload device is substantially isolated from vibrational movement.

5. The gimbal system of claim 1, wherein the payload socket and dovetail insert are cooperatively arranged as at least one of a cam-lock system, spring-lock system, and lever-lock system.

6. The gimbal system of claim 1, wherein at least two payload devices in the plurality of payload devices differ in size, shape, and weight from one another, and wherein the plurality of payload devices includes at least two different types of payload devices.

7. The gimbal system of claim 1, wherein the gimbal assembly includes a gimbal insert arranged to attach the gimbal assembly to a vehicle, and wherein the gimbal insert is arranged to allow the gimbal assembly to attach to and detach from the vehicle without requiring use of a mechanical tool.

8. The gimbal system of claim 7, wherein the gimbal assembly includes a gimbal socket connected to the vehicle, and wherein the gimbal socket is arranged to attach to the gimbal assembly via the gimbal insert.

9. The gimbal system of claim 8, wherein the gimbal insert is arranged to (i) slide into the gimbal socket and (ii) attach in a fixed position within the gimbal socket.

10. The gimbal system of claim 8, wherein the gimbal insert and gimbal socket are cooperatively arranged as at least one of a cam-lock system, spring-lock system, and a lever-lock system.

11. The gimbal system of claim 1, wherein the gimbal assembly includes a gimbal structure having an L-shape to enable open access to the payload device, thereby facilitating a user to attach and detach the payload device to and from, respectively, the gimbal assembly.

12. The gimbal system of claim 1, further comprising:
   a payload-identification routine arranged to detect attachment of a given payload device and query the payload device for identification information; and
   a connection routine arranged to use at least the identification information as a basis to select at least one driver for the payload device, and to connect the payload device to at least one gimbal control system via the selected driver, thereby enabling communications between the gimbal control system and the payload device.

13. The gimbal system of claim 12, further comprising a monitoring routine arranged to determine the operational status of the payload device.

14. The gimbal system of claim 12, further comprising a monitoring routine arranged to modify at least one setting of the payload device.

15. A method comprising:
enabling attachment of a payload device to a gimbal system, wherein enabling attachment comprises enabling any of a plurality of payload devices to attach to and detach from the gimbal system without requiring use of a mechanical tool;
detecting attachment of the payload device;
obtaining identification information corresponding to the payload device;
using at least the identification information as a basis to select at least one driver for the payload device; and
connecting the payload device to at least one gimbal control system via the selected driver, thereby enabling communications between the gimbal control system and payload device.

16. The method of claim 15, further comprising:
determining the operational status of the payload device; and
modifying at least one parameter of the payload device.

17. The method of claim 15, wherein the gimbal system includes a gimbal assembly that includes a payload socket and dovetail insert, wherein the dovetail insert is connected to the payload device, and wherein attaching the payload device to the gimbal system comprises attaching the payload device to the payload socket via the dovetail insert.

18. A gimbal system comprising:
a gimbal assembly that includes a payload socket arranged to attach a payload device to the gimbal assembly, wherein the payload socket is arranged to allow any of a plurality of payload devices to attach to and detach from the payload socket without requiring use of a mechanical tool;
a payload-identification routine stored in memory and arranged to detect attachment of the payload device and query the payload device for identification information; and
a connection routine stored in memory and arranged to use at least the identification information as a basis to select at least one driver for the payload device, and to connect the payload device to at least one gimbal control system via the selected driver, thereby enabling communications between the gimbal control system and payload device.

\* \* \* \* \*